(12) United States Patent
Takane

(10) Patent No.: US 7,265,787 B2
(45) Date of Patent: Sep. 4, 2007

(54) DIGITAL PHOTOGRAPHING DEVICE WITH SEPARATE OPTICAL DISTORTION CORRECTION FOR DYNAMIC IMAGES AND STILL IMAGES

(75) Inventor: Yasuo Takane, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 806 days.

(21) Appl. No.: 10/452,577

(22) Filed: Jun. 3, 2003

(65) Prior Publication Data

US 2003/0223007 A1 Dec. 4, 2003

(30) Foreign Application Priority Data

Jun. 3, 2002 (JP) ............................. 2002-160987

(51) Int. Cl.
*H04N 5/225* (2006.01)
(52) U.S. Cl. ................. 348/335; 348/220.1; 348/222.1
(58) Field of Classification Search ............ 348/220.1, 348/335, 208.99, 208.4, 14.03, 223.1, 208.11
See application file for complete search history.

(56) References Cited

U.S. PATENT DOCUMENTS

| | | | | |
|---|---|---|---|---|
| 5,675,380 A * | 10/1997 | Florent et al. | ............... | 348/251 |
| 5,712,680 A * | 1/1998 | Hieda | ...................... | 348/220.1 |
| 5,818,527 A * | 10/1998 | Yamaguchi et al. | ......... | 348/335 |
| 6,097,430 A * | 8/2000 | Komiya et al. | .......... | 348/218.1 |
| 6,493,027 B2 * | 12/2002 | Ohta et al. | ............... | 348/220.1 |
| 6,721,000 B1 * | 4/2004 | Lin et al. | .................. | 348/223.1 |
| 6,900,832 B1 * | 5/2005 | Yano | ........................ | 348/222.1 |
| 6,937,282 B1 * | 8/2005 | Some et al. | ................. | 348/335 |
| 6,995,790 B2 * | 2/2006 | Higurashi et al. | ........ | 348/218.1 |
| 7,098,955 B2 * | 8/2006 | Koyama et al. | ............. | 348/363 |
| 2002/0075388 A1 * | 6/2002 | Koyama et al. | ............. | 348/220 |
| 2003/0133019 A1 * | 7/2003 | Higurashi et al. | ........ | 348/218.1 |
| 2004/0001138 A1 * | 1/2004 | Weerashinghe et al. | ....... | 348/36 |

FOREIGN PATENT DOCUMENTS

| | | |
|---|---|---|
| JP | 6-292207 A | 10/1994 |
| JP | 10-271490 A | 10/1998 |
| JP | 11-250238 A | 9/1999 |
| JP | 11-250239 A | 9/1999 |
| JP | 11-250240 A | 9/1999 |
| JP | 11-252431 A | 9/1999 |
| JP | 11-275391 A | 10/1999 |
| JP | 2001-101396 A | 4/2001 |

* cited by examiner

*Primary Examiner*—David Ometz
*Assistant Examiner*—Pritham Prabhakher
(74) *Attorney, Agent, or Firm*—Birch, Stewart, Kolasch & Birch, LLP

(57) ABSTRACT

A digital photographing device in which processing time for correcting optical distortion is shortened. A first distortion correction circuit, which can carry out processing at a low correction accuracy but in a short time, and a second distortion correction circuit, which carries out processing at a high correction accuracy but requires time for processing, are provided at an image processing circuit for processing digital image data. Control is carried out such that the second distortion correction circuit is selected and carries out optical distortion correction at a high accuracy only at a time of actually photographing a still image (i.e., when the still image photographing mode is selected and a release button is depressed fully). In other cases, control is carried out such that the first distortion correction circuit is selected.

18 Claims, 8 Drawing Sheets

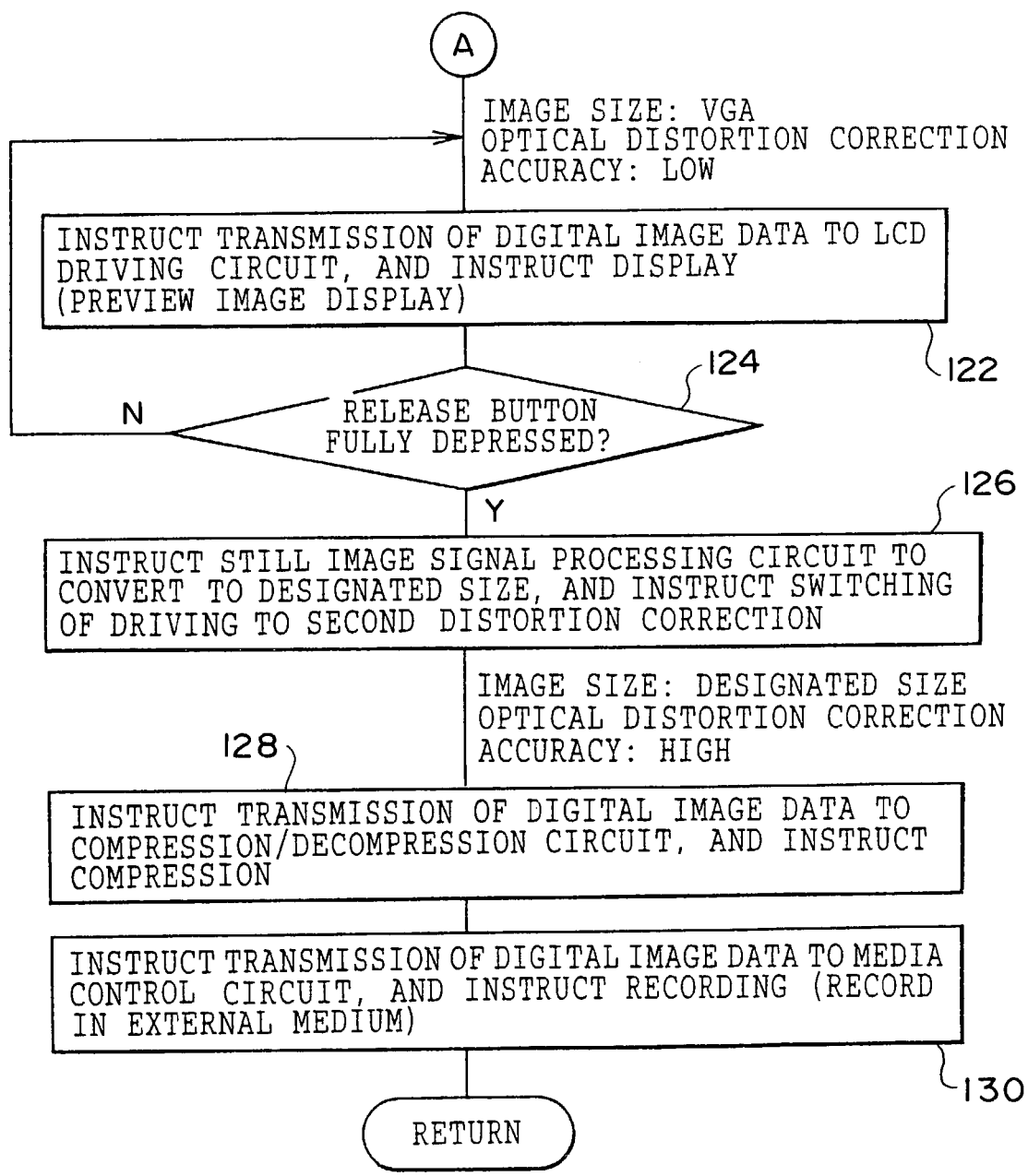

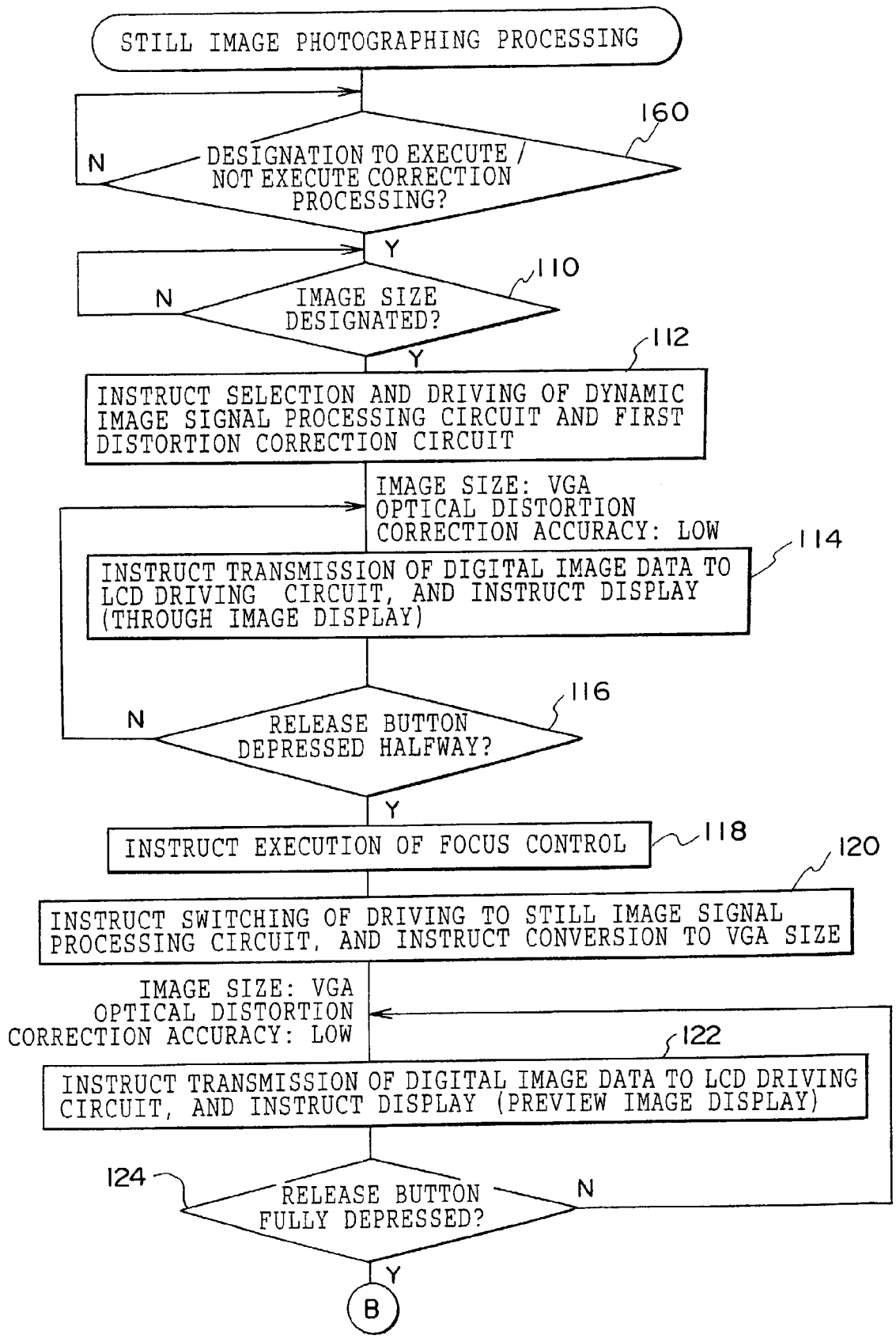

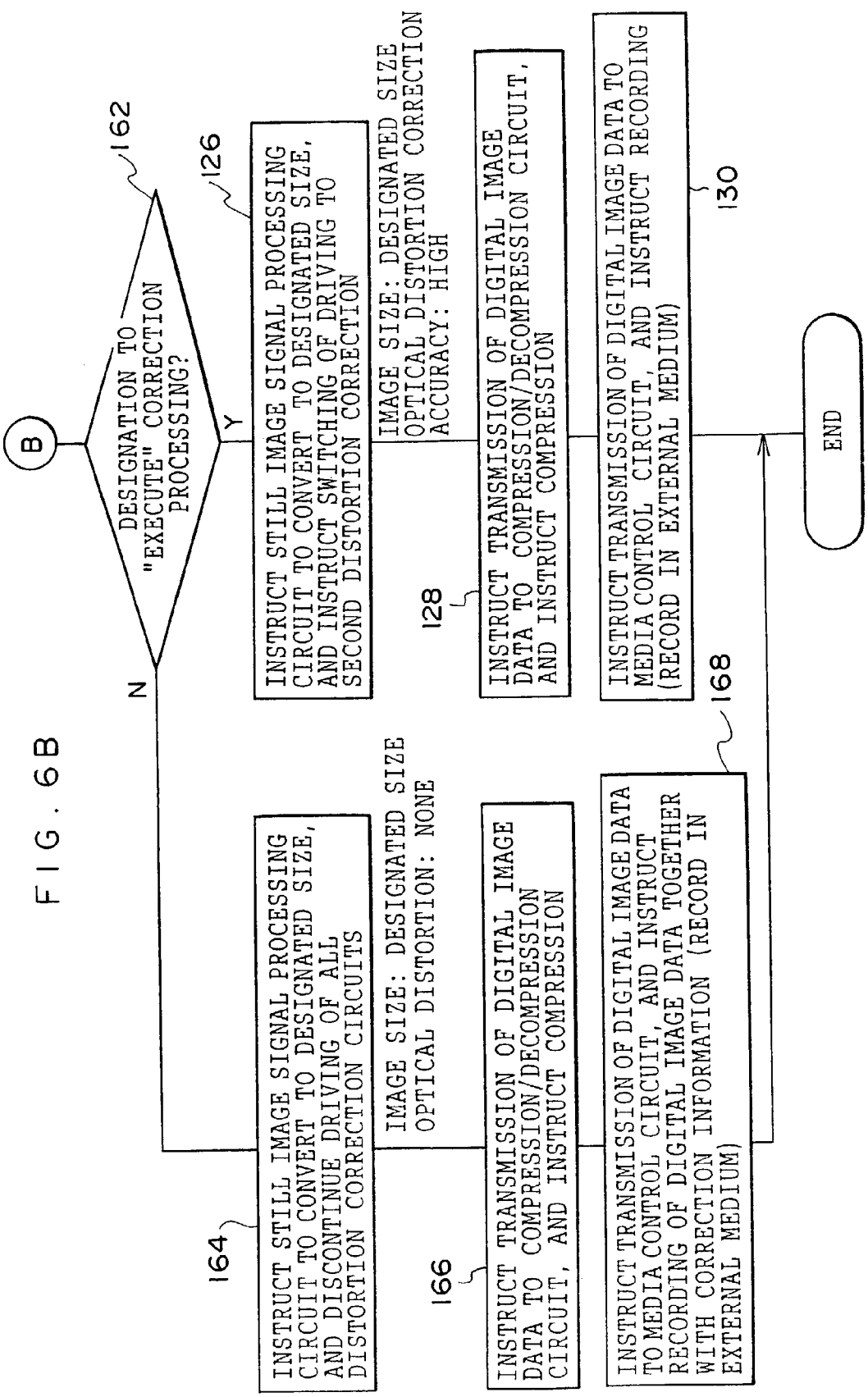

DIGITAL PHOTOGRAPHING DEVICE WITH SEPARATE OPTICAL DISTORTION CORRECTION FOR DYNAMIC IMAGES AND STILL IMAGES

CROSS-REFERENCE TO RELATED APPLICATION

This application claims priority under 35 USC 119 from Japanese Patent Application No. 2002-160987, the disclosure of which is incorporated by reference herein.

BACKGROUND OF THE INVENTION

1. Field of the Invention

The present invention relates to a digital photographing device, and in particular, to a digital photographing device which photographs a subject via an optical lens and acquires digital image data expressing the subject.

2. Description of the Related Art

In a photographing device which photographs a subject through an optical lens and acquires an image which shows the subject, distortion arises at the periphery of the acquired image due to refraction of the lens. Such distortion is generally called optical distortion, and is classified into the following two types: "pin-cushion distortion" in which the corner portions of the image extend outwardly, and "barrel distortion" in which, conversely, the corner portions contract. It is generally known that, in both cases, the amount of distortion (amount of displacement) is determined in accordance with the distance from the optical center.

In the case of a photographing device in which an obtained image is recorded on a film (such as in the case of a silver salt camera), it is not possible to correct an image after recording, and the optical distortion is determined by the lens performance. On the other hand, in the case of a photographing device (such as a digital still camera or a digital video camera or the like) in which an image is acquired by digital data and recorded on a recording medium (such a device is called a "digital photographing device" hereinafter), even after recording, the image can be corrected by computational processing. Thus, in the field of digital photographing devices, techniques relating to the correction of optical distortion have conventionally been proposed.

For example, Japanese Patent Application Laid-Open (JP-A) No. 6-292207 discloses a method in which a correction amount is determined at each coordinate of an image, and the correction amounts are stored in advance as a table in a memory. On the basis of the stored correction amounts, linear interpolation is carried out on digital image data obtained by photographing a subject, such that each pixel is corrected. However, in this technique, the memory which stores the table of correction amounts requires a storage capacity corresponding to the size of the image. If the image size is large, the storage capacity required by the memory is also large. This results in a reduction in the work region and an increase in costs.

A technique intended to solve this problem is the method, disclosed in JP-A No. 11-252431, of carrying out correction by expressing the correction amounts by an approximate expression. Namely, it is generally known that the displacement amount of the optical distortion can be approximately expressed by a polynomial, and the inverse thereof is used as a correction formula. In this technique, there is no need to hold the correction amounts of the respective coordinates in a table. Provided that only parameters (the coefficients of the polynomial) are stored in a memory, all of the coordinates of an image before and after correction can be set in correspondence by computation. Further, in order to handle different focal lengths such as the telephoto end and the wide-angle end and the like, JP-A No. 11-275391 discloses storing parameters for each focal length, and carrying out correction by selecting the parameters in accordance with the focal length at the time of photographing.

Moreover, JP-A No. 11-250240 discloses a technique of making the correction processing faster by converting digital image data (RGB data) to YUV data, thinning out the UV data thereamong, and carrying out correction.

Note that, among application software executed at computers (PCs), there are application software for carrying out correction processing of optical distortion. Image data, which was photographed by a digital photographing device, is transmitted to a PC, and the optical distortion can be corrected by the PC executing the application software. However, the work for installing in the PC the application software which carries out the optical distortion correction processing, and the work for transmitting the digital image data for which correction is desired to a PC (a built-in RAM or the like), are required. In order to decrease the burden of work borne by the photographer, it is desirable to carry out correction at the digital photographing device as in the above-described techniques.

A digital photographing device generally has a display portion such as an LCD (liquid crystal display) for displaying the image (a still image or dynamic images) which shows the subject. It is often the case that the subject which is currently being photographed is displayed as dynamic images on the display portion substantially in real time (so-called through image display). The display portion can thereby be used as a finder.

However, in all of the above-described conventional techniques, correction is carried out by the same correction section regardless of the type of digital image data. Thus, for example, correction at a high correction accuracy of the level used for still images is carried out as well on dynamic images which do not require high correction accuracy. Thus, a problem arises in that processing requires more time than needed.

In particular, conventional techniques cannot handle cases in which dynamic images showing a subject are displayed substantially in real time on the display portion, and can only display dynamic images without carrying out correction thereon. Thus, even if the photographer carries out photographing by confirming the subject on the finder, the subject, which is expressed by the digital image data obtained by the actual photographing, is different from that which the photographer imagined, and there are cases in which photographing must be carried out again.

SUMMARY OF THE INVENTION

The present invention was developed in order to overcome the above-described problems, and an object of the present invention is to provide a digital photographing device in which the processing time for correcting optical distortion can be shortened.

In order to achieve the above object, a first aspect of the present invention is a digital photographing device photographing a subject via an optical lens and acquiring digital image data expressing the subject, the digital photographing device comprising: a plurality of correction sections correcting optical distortion included in the digital image data, and having different correction accuracies and different processing speeds corresponding to the correction accuracies; a photographing mode selecting section for selecting at least which of a still image photographing mode and a dynamic image photographing mode the subject is to be photographed in; and a control section which, on the basis of results of selection by the photographing mode selecting section, selects the correction section, and carries out control such that the optical distortion of the digital image data is corrected by the selected correction section.

In accordance with the first aspect of the present invention, a plurality of correction sections which correct optical distortion of digital image data are provided. The plural correction sections have respectively different correction accuracies, and the processing speeds thereof also differ in accordance with their correction accuracies. At the digital camera, it is selected, by the photographing mode selecting section, whether the subject is to be photographed as dynamic images or is to be photographed as a still image. Photographing is carried out in accordance with the photographing mode selected by the photographing mode selecting section. Under control of the control section and on the basis of the results of selection by the photographing mode selecting section, one of the plural correcting sections is selected, and the digital image data which is obtained by photographing is subjected to optical distortion correction by the selected correcting section.

In this way, in accordance with the photographing mode, it is possible to switch between correction being carried out with high accuracy and correction being carried out with low accuracy, and it is possible to adjust the processing time required for correction of the optical distortion. For example, when a photographing mode for photographing a subject by dynamic images whose requirements for correctional accuracy are not high is selected, if a correcting section which has a relatively low correction accuracy is selected and the optical distortion is corrected, the optical distortion can be corrected in a short time, and an image based on the digital image data after the optical distortion correction can be displayed substantially in real time.

A second aspect of the present invention has the feature that, in the first aspect, during a series of photographing processings from selection of the photographing mode by the photographing mode selecting section to completion of photographing in accordance with that photographing mode, the control section switches selection of the correction section at each predetermined processing stage.

In accordance with the second aspect of the present invention, when the still image photographing mode is selected for example, it is possible to switch between correcting at a high accuracy or correcting at a low accuracy, for each of the processing stages during the series of photographing processings (sequence processings) for photographing a still image. The processing time required for correction of the optical distortion can thereby be adjusted.

A third aspect of the present invention has the feature that the digital photographing device of the first or second aspect further comprises a correction execution selecting section for setting whether or not the correction is to be executed, wherein the control section discontinues correction by the correction section when it is selected by the correction execution selecting section that correction is not to be executed.

In accordance with the third aspect, it is possible to select whether or not optical distortion correction is to be executed. Thus, even if optical distortion is included in the digital image data, in cases in which optical distortion correction is not particularly needed, such as when the photographer does not mind the optical distortion, the correction is discontinued (omitted), and it is possible to shorten the overall processing time relating to photographing. Note that, in a case in which correction is discontinued, correction information relating to the correction which was discontinued, e.g., information expressing that correction was not carried out or information expressing a polynomial function which approximates the optical distortion and which will be required when correction is carried out later, or the like may be stored in a storing section. Further, this correction information is preferably stored in a storing section together with the digital image data whose correction was discontinued.

Moreover, in the above-described digital photographing device, if the correction section which has a relatively low correction accuracy corrects the optical distortion only with respect to one predetermined direction (e.g., the horizontal direction), the correction accuracy will be low but the processing speed will be fast.

In the above-described digital photographing device, at at least one of the correction sections, an image size of an object of correction may be fixed.

Moreover, in the above-described digital photographing device, for each of the plurality of correction sections, an output destination of digital image data after correction may be fixed.

Further, in the above-described digital photographing device, in order to decrease the memory capacity required for correction by the correction sections, it is preferable that the correction sections approximate the optical distortion by a polynomial, and correct the optical distortion by interpolating each pixel after correction from digital image data before correction.

BRIEF DESCRIPTION OF THE DRAWINGS

FIGS. 4A and 4B are flowcharts showing still image photographing processing (a sub-routine) executed at the CPU of the digital camera relating to the present embodiment.

FIGS. 6A and 6B are flowcharts showing still image photographing processing (a sub-routine) executed at a CPU of a digital camera relating to another embodiment.

DETAILED DESCRIPTION OF THE INVENTION

An example of an embodiment relating to the present invention will be described in detail hereinafter with reference to the drawings.

Figure 1:
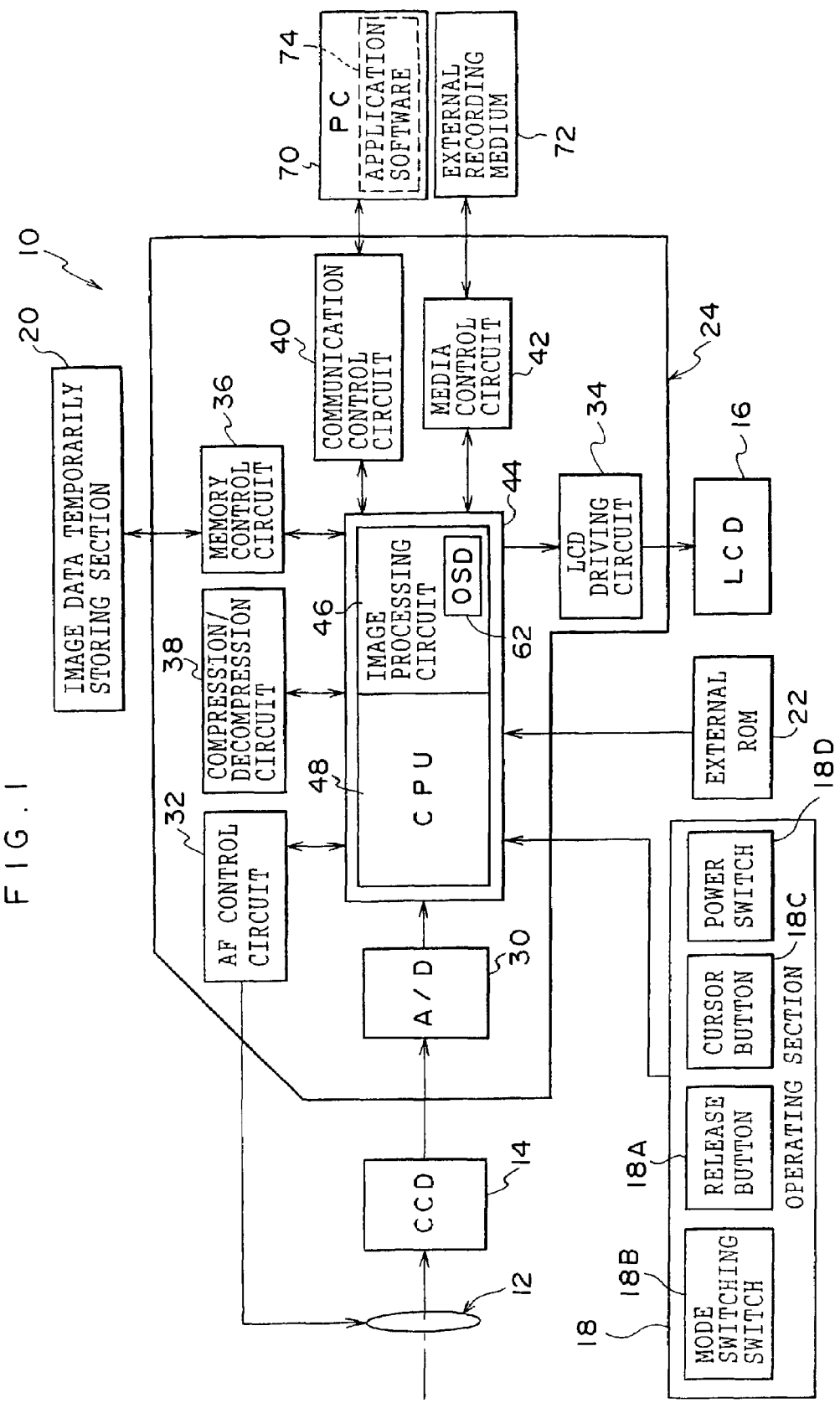
FIG. 1 is a block diagram showing the schematic structure of an electrical system of a digital camera relating to an embodiment of the present invention.

As shown in FIG. 1, a digital camera 10 relating to the present embodiment is structured to include an optical unit 12 for imaging a subject to be photographed; a CCD (charge coupled device) 14 disposed at the optical axis rear side of the optical unit 12; an LCD 16 for displaying an image obtained by photographing by the digital camera 10, and various types of information; an operation section 18 operated by the photographer; an image data temporarily storing section 20 such as an SRAM or an SDRAM or the like, for temporarily storing the digital image data obtained by photographing by the CCD 14; an external ROM 22 in which various programs, parameters, conversion tables and the like are stored in advance; and a main controlling section 24 governing the overall operation of the digital camera 10.

The operation section 18 includes a release button 18A operated at the time of instructing execution of photographing of a still image or dynamic images; a mode switching switch 18B serving as a photographing mode selecting section which is operated in order to select one of a still image photographing mode, a dynamic image photographing mode, and a playback mode; a cursor button 18C operated in order to set various parameters or to designate an image which is to be played back when the playback mode is selected; a power switch 18D operated to turn the power source of the digital camera 10 on and off; and the like.

Further, the main controlling section 24 is structured such that an A/D converter 30 which converts an analog signal into a digital signal, an A/F control circuit which adjusts the optical zoom magnification and the focal point of the optical unit 12, an LCD driving circuit 34 which drives the LCD 16, a memory control circuit 36 which controls reading and writing of data from and to the image data temporarily storing section 20, a compression/decompression circuit 38 which compresses and decompresses digital image data, a communication control circuit 40 for transmitting and receiving various types of data to and from a PC 70 which serves as an external device and is connected to the digital camera 10 via a predetermined cable such as a USB cable or the like, and a media control circuit 42 controlling reading and writing of various types of data to and from an external recording medium 72 such as a Smart Media, an IC card, a CD-R, a CD-RW or the like, are connected to a computing section 44 which carries out control computation of the entire main controlling section 24. The computing section 44 is structured to include an image processing circuit 46 which carries out predetermined processings on an inputted digital signal and generates digital image data, and a CPU 48 serving as a control section which governs control of the main controlling section 24.

Note that, in the present embodiment, the main controlling section 24 is structured as a one-chip LSI (large scale integrated circuit). The digital camera 10 can thereby be made compact, reliable, and inexpensive.

These respective sections will be described in detail hereinafter.

The optical unit 12 has a zoom lens group and a focus lens (neither of which are illustrated), and a lens moving mechanism for moving the zoom lens group and the focus lens in the direction of the optical axis. The optical unit 12 is structured as a zoom lens whose focal length can be changed (whose magnification can be changed).

The optical unit 12 is connected to the A/F control circuit 32. Due to control of the A/F control circuit 32, the zoom lens group is moved in the direction of the optical axis such that the zoom magnification becomes a desired zoom magnification (a lens whose focal length can be varied). The focus lens is moved in the direction of the optical axis (autofocus (AF) mechanism), such that the incident light, which has passed through the lenses and expresses the subject, is imaged on the light-receiving surface of the CCD 14. In this way, at the CCD 14, on the basis of the incident light which has passed through the lenses of the optical unit 12 and expresses the subject, the subject is photographed, and an analog image signal expressing the subject is outputted.

As the focus control in the present embodiment, focus control is carried out automatically such that the focal point is suited to the subject which exists at a predetermined position (the AF frame) within the photographing area, by using a so-called TTL (through the lens) method in which the lens positions are adjusted such that the contrast of the image obtained by photographing is a maximum. Specifically, when the still image photographing mode for photographing a still image is selected by the operator operating the mode switching switch of the operating section 18, focus control is carried out automatically by the release button 18A being depressed halfway. On the other hand, when the dynamic image mode for photographing dynamic images is selected, the release button 18A is depressed fully and photographing is started. Thereafter, focus control is carried out continuously.

Photographing by the CCD 14 is carried out in a case in which a photographing mode for photographing a still image or dynamic images (the still image photographing mode or the dynamic image photographing mode) is selected. Specifically, when the still image photographing mode is selected and the release button 18A is depressed fully, photographing is carried out one time at a predetermined shutter speed and exposure amount, and a still image expressing the subject is photographed. In other cases, i.e., when the still image photographing mode or the dynamic image photographing mode is selected and there is a photographing standby state for photographing of a still image or dynamic images, or when the dynamic image photographing mode is selected and the release button 18A is depressed fully, it is possible to carry out dynamic image photographing in which continuous results of photographing by the CCD 14 are outputted.

The A/D converter 30 is connected to the output end of the CCD 14. Namely, the A/D converter 30 converts the analog image signal, which expresses the subject which was photographed and outputted by the CCD 14, into a digital image signal. The output end of the A/D converter 30 is connected to the image processing circuit 46 of the computing section 44. Namely, after the image signal, which expresses the subject obtained by the CCD 14 at the time of photographing, is converted from an analog signal into a digital signal, the digital signal is inputted to the image processing circuit 46 and is treated as digital image data.

Figure 2:
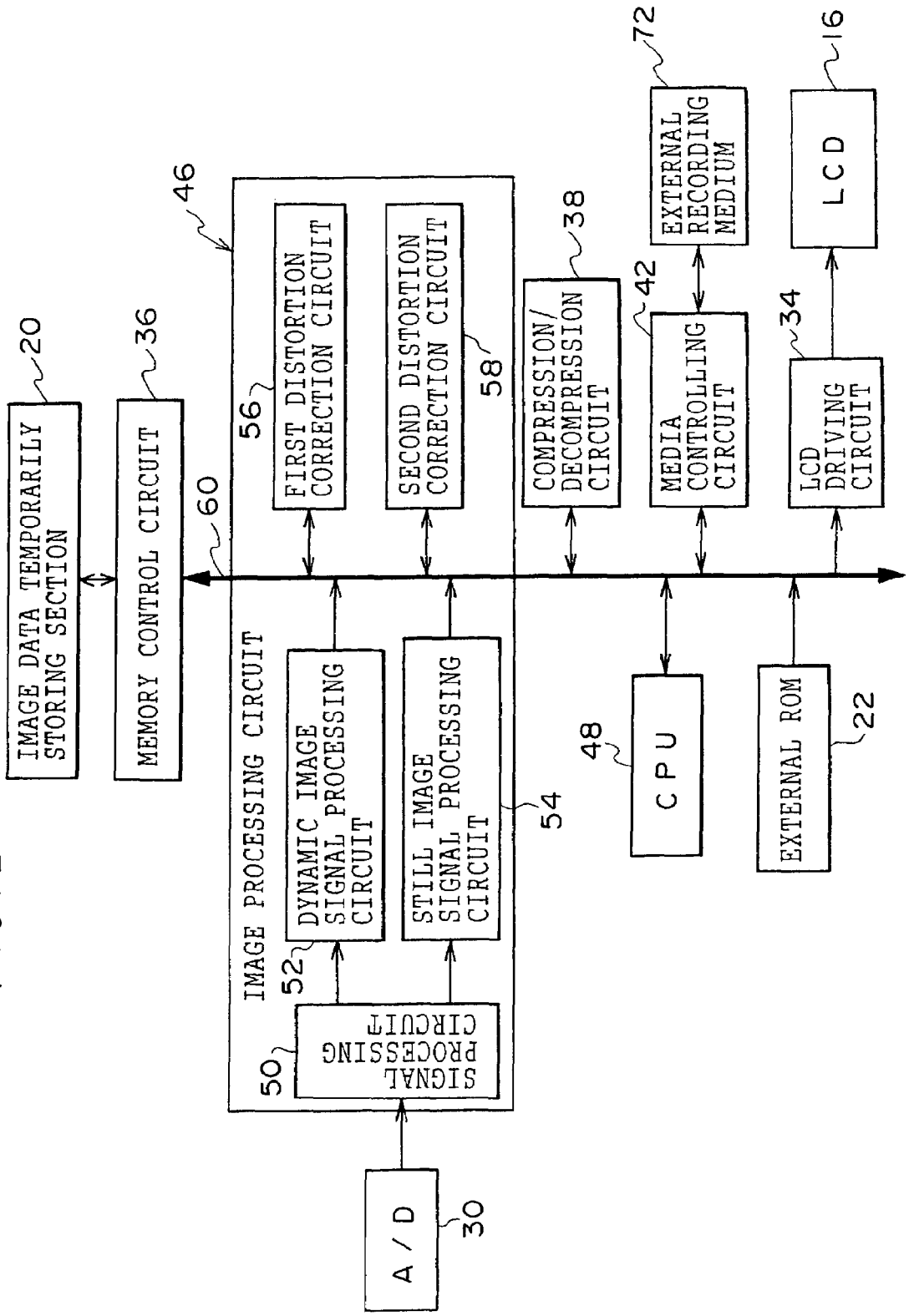
FIG. 2 is a block diagram showing the schematic structure of an image processing circuit relating to the present embodiment and an electrical system at the periphery thereof.

As shown in FIG. 2, the image processing circuit 46 is structured to include a signal processing circuit 50 which, regardless of whether the image is a still image or dynamic images, carries out predetermined digital signal processings on the inputted digital image data; a dynamic image signal processing circuit 52 which carries out predetermined digital signal processings on digital image data expressing dynamic images; a still image signal processing circuit 54 carrying out predetermined digital signal processings on digital image data expressing a still image; and a first distortion correction circuit 56 and a second distortion correction circuit which serve as correcting sections and are for correcting optical distortion.

At the image processing circuit 46, the digital image data from the A/D converter 30 is first inputted to the signal processing circuit 50. At the signal processing circuit 50, the digital image data is subjected to, for example, various types of correction processings such as white balance adjustment, gamma correction, sharpness correction, and the like, and is subjected to a processing called YC conversion processing which converts the RGB data into a YC signal.

The output end of the signal processing circuit 50 is connected to the dynamic image signal processing circuit 52 and the still image signal processing circuit 54. The digital image data, which has been subjected to the respective correction processings and YC conversion by the signal processing circuit 50, is inputted to the dynamic image signal processing circuit 52 and the still image signal processing circuit 54.

Moreover, gradation conversion processing, for converting the size of the image data, is carried out at the dynamic image signal processing circuit 52 or the still image signal processing circuit 54.

The dynamic image signal processing circuit 52 is driven at the time of photographing standby for a still image or dynamic images, and at the time of photographing dynamic images. The dynamic image signal processing circuit 52 thins out, at each predetermined number of pixels, the inputted digital image data, i.e., the digital image data which was obtained by photographing by the CCD 14 and which is of the maximum size (e.g., 2400×1800 pixels, and hereinafter, this size will be called the "actually photographed size"), and converts the gradation such that image size becomes a predetermined image size set in advance. Note that the predetermined image size used in this case is generally VGA size (640×480 pixels) or QVGA size (320×240 pixels). Therefore, in the present embodiment, the image size is converted to VGA size as an example.

On the other hand, the still image signal processing circuit 54 is driven at the time of photographing a still image. When the release button 18A is depressed halfway, the still image signal processing circuit 54 gradation-converts the inputted digital image data of the actually photographed size, into a predetermined image size which is set in advance and which is smaller than the actually photographed size. Note that, in the present embodiment, when the release button 18A is depressed halfway, as an example, the digital image data is gradation-converted into VGA size. Namely, the digital image data is made to be the same image size as at the time of photographing standby and at the time of dynamic image photographing.

Further, when the release button 18A is depressed fully, the gradation is converted to as to become an image size designated by the photographer in advance. Note that, in the present embodiment, as an example, the photographer can designate any one image size from among 2400×1800 pixels, 1600×1200 pixels, 1280×960 pixels, and 640×480 pixels (VGA size). Further, when the actually photographed size is designated by the photographer, gradation conversion is of course not carried out at the time when the release button 18A is depressed fully.

Note that the present embodiment illustrates a case in which, after the various types of correction processings and the YC conversion processing have been carried out by the signal processing circuit 50 on the digital image data which is of the maximum size and which was obtained by photographing by the CCD 14, the digital image data is gradation-converted to an image size other than the maximum size by the dynamic image signal processing circuit 52 or the still image signal processing circuit 54. However, the present invention is not limited to the same. The processing time may be shortened by, when reading the data from the CCD 14, carrying out reading while thinning the pixels, and carrying out gradation conversion simultaneously with the reading, or by carrying out gradation conversion immediately after A/D conversion (before the various types of correction processings and the YC conversion processing).

Both the dynamic image signal processing circuit 52 and the still image signal processing circuit 54 are connected to a bus 60. The first distortion correction circuit 56, the second distortion correction circuit 58, and the CPU 48 are connected to the bus 60. Namely, within the computing section 44, the image processing circuit 46 and the CPU 48 are connected together via the bus 60.

Moreover, the A/F control circuit 32, the LCD driving circuit 34, the memory control circuit 36, the compression/decompression circuit 38, the communication control circuit 40, the media control circuit 42, the external ROM 22, and the operation section 18 also are connected to the computing section 44 via the bus 60. Note that the A/F control circuit 32, the communication control circuit 40, and the operation section 18 are omitted from FIG. 2.

The digital image data, which has been processed by the dynamic image signal processing circuit 52 or the still image signal processing circuit 54, is inputted via the bus 60 to the first distortion correction circuit 56 or the second distortion correction circuit 58.

Parameters expressing a polynomial which approximates the amount of displacement of the optical distortion (i.e., the coefficients of a polynomial) are stored in advance in each of the first distortion correction circuit 56 and the second distortion correction circuit 58. By using these parameters, the first distortion correction circuit 56 and the second distortion correction circuit 58 correct the optical distortion included in the inputted digital image data.

Specifically, the amount of displacement of the optical distortion can be approximately expressed by a multidimensional function F(d) of a distance d from the center of the image (the optical center). Accordingly, given that the coordinates of a pixel in the image after correction are (x,y) (wherein x and y are integers), the corresponding coordinates (X,Y) in the image before correction are expressed by the following formula.

$$(X,Y) = (x \times F(d), y \times F(d)), \quad d = (x^2 + y^2)^{1/2}$$

The correction of the optical distortion can be carried out by determining in this way the coordinates (X,Y) in the image before correction which correspond to the coordinates (x,y) in the image after correction, and thereafter, moving the pixel data P, which is at the coordinates (X,Y) in the image before correction, to the coordinates (x,y) in the image after correction. However, usually, the coordinates (X,Y) in the image before correction which are determined by the above formula are not integers, and pixel data corresponding to the image before correction does not exist.

Thus, the pixel data corresponding to the determined coordinates (X,Y) in the image before correction must be interpolated from the pixel data which actually exists in a vicinity of these coordinates (X,Y) in the image before correction. Examples of the method of interpolation in this case are nearest neighbor interpolation and bi-linear interpolation.

Namely, optical distortion can be corrected by making the pixel data, which is determined by interpolation in accordance with an interpolation method such as nearest neighbor interpolation, bi-linear interpolation, or the like, into pixel data of the coordinates (x,y) in the image after correction.

Here, the parameters, which express the polynomial approximating the amount of displacement of the optical distortion and which are stored in the first distortion correcting circuit 56 (i.e., the set of coefficients of the multidimensional function F(d)), are set in advance so as to be peculiar to the predetermined size obtained at the time of photographing standby or at the time of dynamic image photographing (in the present embodiment, the VGA size). Namely, at the first distortion correction circuit 56, the image size which is the object of correction is fixed, and the number of parameters which must be held is lower than in a case in which a plurality of image sizes are objects of processing.

As described above, the digital camera 10 of the present embodiment has an optical zoom function. Thus, parameters which are peculiar to the predetermined image size obtained at the time of photographing standby or at the time of dynamic image photographing (the VGA size in the present embodiment) can be stored for each of a plurality of predetermined focal distances. The group of optimal parameters can be selected in accordance with the focal length at the time of obtaining the digital image data which is the object of correction, and processing for correcting the optical distortion can be carried out.

The parameters stored in the first distortion correction circuit 56 are set such that the correction accuracy is relatively low. The correction accuracy is intentionally lowered, and the processing time can be shortened and the circuit structure of the first distortion correction circuit 56 can be made simple by an amount corresponding to the amount by which the correction accuracy is lowered.

Here, VGA size and QVGA size are sizes which are smaller than the actually photographed size. Thus, even if effects of the optical distortion remain in the image because the correction accuracy has been lowered, they are of an extent which cannot be perceived visually. In particular, distortion of an image in the horizontal direction is seen by humans as more marked than distortion of an image in the vertical direction. Thus, in the present embodiment, specifically, only the distortion in the horizontal direction is corrected at the first distortion correction circuit 56. Note that in cases in which the processing speed is improved, the distortion in the vertical direction can also be corrected.

On the other hand, parameters expressing a polynomial which approximates the amount of displacement of optical distortion, are stored in the second distortion correction circuit 58 for each image size which can be specified by the photographer at the time of photographing a still image. The parameters are set so as to give priority to the quality of each image. In the second distortion correction circuit 58, the parameters corresponding to the image size designated by the photographer are selected, and processing for correcting the optical distortion is carried out. Namely, when a still image is photographed, the optical distortion can be corrected at a high correction accuracy.

Note that parameters of each image size for each of the plurality of predetermined focal lengths can be stored in the second distortion correction circuit 58 as well. Processing for correcting the optical distortion can be carried out by selecting the optimal parameters, in accordance with the focal length at the time of obtaining digital image data which is the object of correction, from among the parameters corresponding to the image size designated by the photographer.

The digital image data, which has been subjected to optical distortion correcting processing in the first distortion correction circuit 56 or the second distortion correction circuit 58, is transmitted to the memory control circuit 36 via the bus 60, and, under the control of the memory control circuit 36, is temporarily stored in the image data temporarily storing section 20.

At the digital camera 10, the corrected digital image data which has been stored in the image data temporarily storing section 20 in this way, is read by the memory control circuit 36, is transmitted to the compression/decompression circuit 38 via the bus 60, and is compressed in a predetermined compression format (e.g., JPEG) by the compression/decompression circuit 38. Thereafter, the data can be transmitted to the media control circuit 42 via the bus 60, and can be stored in the external recording medium 72 by the media control circuit 42.

The LCD 16 is connected to the LCD driving circuit 34. The LCD driving circuit 34 converts the digital image data (the YC signal) for which display is desired into an NTSC (National TV Standards Committee) signal, and supplies the signal to the LCD 16. In this way, an image based on the digital image data is displayed on the LCD 16.

Specifically, at the digital camera 10, when a photographing mode for photographing dynamic images or a still image is selected by the photographer operating the mode switching switch of the operation section 18, the digital image data, which has been corrected and is stored in the image data temporarily storing section 20, is read by the memory control circuit 36, and is transmitted to the LCD driving circuit 34 via the bus 60. In this way, when the photographing mode is selected, an image, which is based on the digital image data which has just been photographed by the CCD 14, is displayed on the LCD 16 substantially in real time. Further, images which are obtained by continuous photographing by the CCD 14 (so-called through images) are dynamically displayed on the LCD 16 such that the LCD 16 can be used as a finder.

Further, when the playback mode for playing back an image is selected, the digital image data, which is the object of playback and is stored in the external recording medium 72, is read by the media controlling circuit 42, is transmitted to the compression/decompression circuit 38 via the bus 60, and is decompressed by the compression/decompression circuit 38. Thereafter, the data is transmitted to the LCD driving circuit 34 via the bus 60. In this way, when the playback mode is selected, an image, which is based on digital image data which was photographed before and which is stored in the external recording medium 72, can be playback-displayed on the LCD 16.

Moreover, the digital camera 10 is equipped with an OSD (on screen display) function which, on the LCD 16 and as needed, displays various types of bitmap data expressing various types of menus, a still image/dynamic image photographing mode mark, the date, a frame showing the A/F frame, parameters relating to the image processing, a message or the like, such that they are superposed on the subject obtained by photographing. Thus, the digital camera 10 is equipped with an OSD circuit 62 in the image processing circuit 46 (refer to FIG. 1; the OSD circuit 62 is not shown in FIG. 2).

Specifically, at the digital camera 10, the digital image data which is read from the image data temporarily storing section 20, or the digital image data which is read from the external recording medium 72 and decompressed by the compression/decompression circuit 38, is inputted to the OSD circuit 62. Digital image data, which is in a state in which bitmap data is superposed on the subject expressed by the aforementioned digital image data, is generated by the OSD circuit 62, and is supplied to the LCD driving circuit 34. In this way, an image, in which bitmap data is superposed on the subject, can be displayed on the LCD 16. Note that the bitmap data is stored in advance in the external ROM 22, and the necessary bitmap data is selected and read out from the external ROM 22.

Further, the CPU 48 governs the operations of the above-described respective sections. The CPU 48 grasps the operational state of the operation section 18 by the photographer, and controls the operations of the above-described respective sections in accordance with the grasped operational state.

Figure 3:
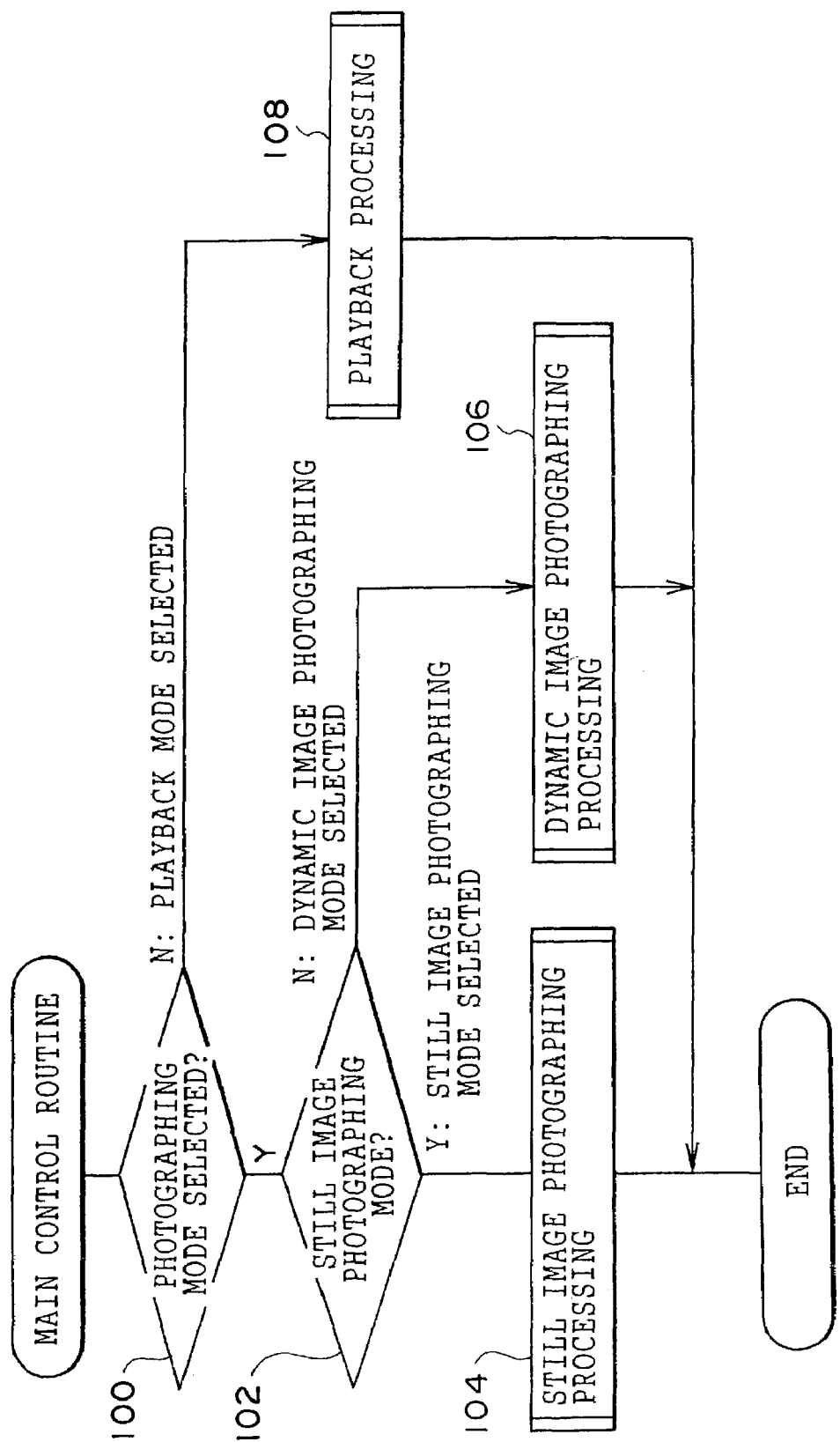
FIG. 3 is a flowchart showing a control routine (a main routine) executed at a CPU of the digital camera relating to the present embodiment.

Next, operation of the present embodiment will be described with reference to FIG. 3. FIG. 3 shows a control routine which is executed by the CPU 48.

The digital camera 10 of the present embodiment is activated by operation of the power switch 18D. When the photographer wishes to photograph a still image or dynamic images of a subject, he/she operates the mode switching switch 18B, and selects the still image photographing mode or the dynamic image photographing mode.

When the photographing mode is selected by the photographer operating the mode switching switch 18B, at the CPU 48, as shown in FIG. 3, if the selected photographing mode is the still image photographing mode, the routine moves from step 100 to step 102 and then to step 104. Sequence processing (still image photographing processing), which is for photographing a still image and which is shown in FIGS. 4A and 4B, is carried out.

Figure 4A:
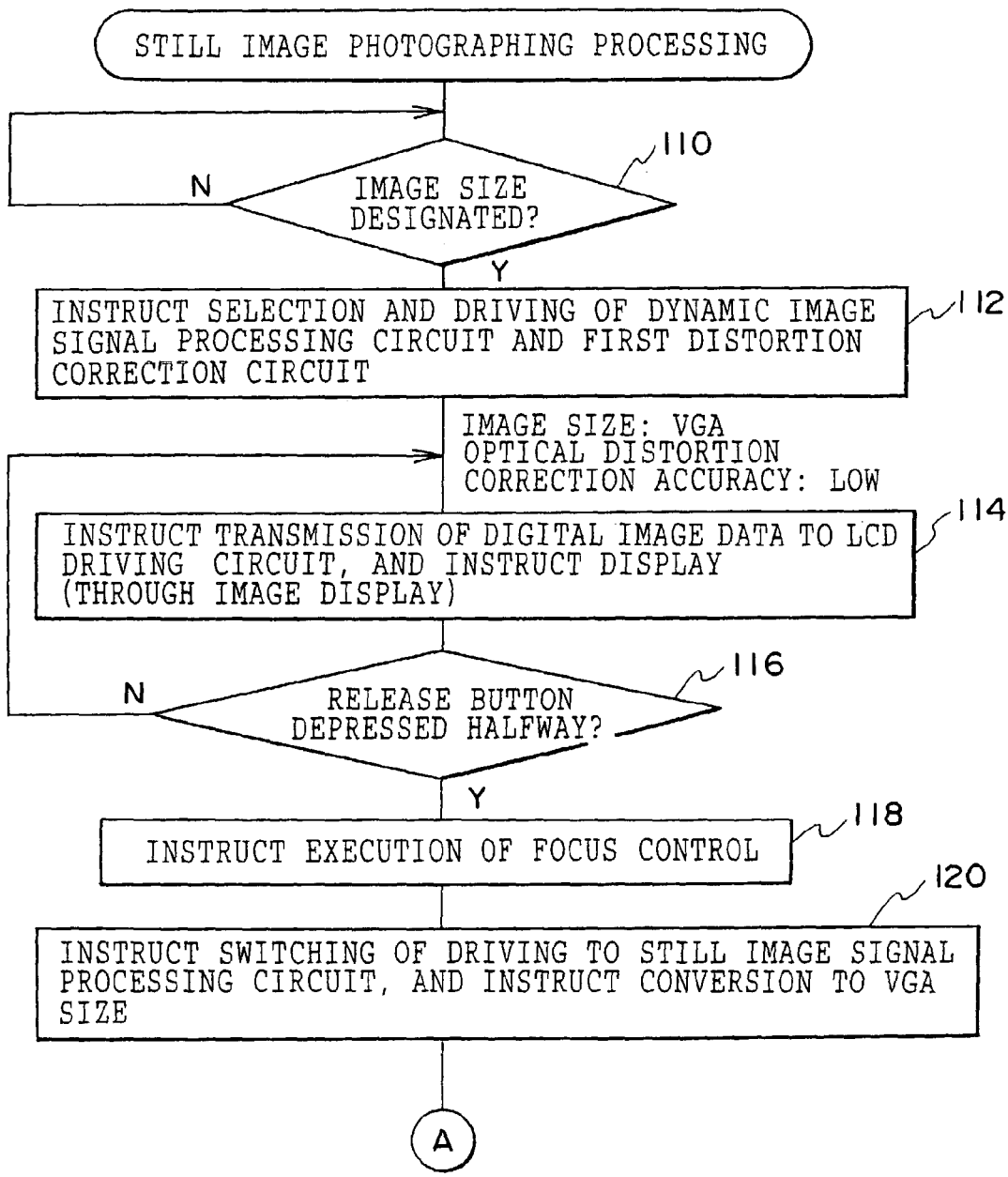

As shown in FIGS. 4A and 4B, in the still image photographing processing, first, in step 110, a list of image sizes which can be selected is displayed on the LCD 16, and the photographer is urged to designate an image size. When the image size of the still image which the photographer wishes to acquire is designated by the photographer operating the cursor button 18C or the like, the routine moves from step 110 to step 112. In step 112, the image signal processing circuit 46 is instructed to select and drive the dynamic image signal processing circuit 52 and the first distortion correction circuit 56, and other predetermined activating processings are carried out, and a photographing standby state arises.

In the photographing standby state, continuous photographing is carried out by the CCD 14, and an analog image signal showing the subject at each photographing is obtained. This analog image signal is converted into digital image data by the A/D converter 30, and thereafter, is inputted to the image processing circuit 46.

At the image processing circuit 46, first, various types of correction processings and YC conversion processing are carried out at the signal processing circuit 50 on the digital image data of each photographing which has been obtained by the continuous photographing. Thereafter, in accordance with a driving instruction from the CPU 48, the output of the signal processing circuit 50 is selectively inputted to the dynamic image signal processing circuit 52 or the still image signal processing circuit 54. In accordance with a driving instruction from the CPU 48, the output of the dynamic image signal processing circuit 52 or the still image signal processing circuit 54 is selectively inputted to the first distortion correction circuit 56 or the second distortion correction circuit 58.

Accordingly, at the time of photographing standby in the case in which the still image photographing mode is selected, the digital image data which has been processed at the signal processing circuit 50 is inputted to the dynamic image signal processing circuit 52 which has been driven by instruction of the CPU 48. The digital image data which has been processed by the signal processing circuit 50 is gradation-converted into VGA size by the dynamic image signal processing circuit 52. Then, at the image processing circuit 46, the digital image data which has been converted into VGA size is transmitted to the first distortion correction circuit 56 which has been driven by instruction of the CPU 48, and processing for correcting the optical distortion is carried out at the first distortion correction circuit 56.

Namely, the first distortion correction circuit 56 is selected for the digital image data which has been converted into VGA size by the dynamic image signal processing circuit 52. Correction of the optical distortion is carried out at the relatively low correction accuracy of only horizontal direction correction, by the first distortion correction circuit 56. The digital image data after this optical distortion correction is temporarily stored in the image data temporarily storing section 20 via the memory control circuit 36.

Then, in subsequent step 114, the CPU 48 instructs the memory control circuit 36 to read the digital image data which is stored in the image data temporarily storing section 20 and transmit it to the LCD driving circuit 34. The CPU 48 instructs the LCD driving circuit 34 to carry out dynamic image display of the image based on this digital image data.

In this way, the digital image data is read out by the memory control circuit 36 from the image data temporarily storing section 20, and is transmitted to the LCD driving circuit 34 via the memory control circuit 36. After the digital image data is converted into an NTSC signal by the LCD driving circuit 34, the NTSC signal is supplied to the LCD 16. The results of continuous photographing by the CCD 14 are displayed as dynamic images on the LCD 16.

Thereafter, until the release button 18A is operated by the operator, the CPU 48 returns from step 116 to step 114 and repeats the same processings.

Namely, at the time of photographing standby in the case in which the still image photographing mode is selected, the results of continuous photographing by the CCD 14 (the digital image data expressing the subject) are converted into VGA size. The optical distortion is corrected at a low correction accuracy, and the data is displayed as dynamic images on the LCD 16 (so-called through image display). The photographer uses the LCD 16, which is in the midst of carrying out this dynamic image display, as a finder, determines the composition of the subject, and depresses the release button 18A halfway.

When the release button 18A is depressed halfway, the routine proceeds from step 116 to step 118 where the CPU 48 instructs the A/F control circuit 32 to execute focus control. Further, in step 120, the CPU 48 instructs the image processing circuit 46 to switch driving from the dynamic image signal processing circuit 52 to the still image signal processing circuit 54, and to carry out gradation conversion to VGA size at the still image signal processing circuit 54.

In this way, focus control is carried out automatically by the A/F control circuit 32. The results of photographing by the CCD 14 after focus control are converted to digital image data by the A/D converter, and thereafter, are inputted to the image processing circuit 46. At the image processing circuit 46, first, the digital image data inputted from the signal processing circuit 50 is subjected to the same processings as at the above-described photographing standby time. Thereafter, the data is inputted to the still image signal processing circuit 54, and is gradation-converted to VGA size by the still image signal processing circuit 54. At the image processing circuit 46, the digital image data which has been converted to VGA size is transmitted to the first distortion correction circuit 56 which is driven by instruction of the CPU 48, and processing for correcting the optical distortion is carried out at the first distortion correction circuit 56.

Namely, correction of optical distortion is carried out at the relatively low correction accuracy of only horizontal direction correction by the first distortion correction circuit 56 also on the digital image data which has been converted into VGA size by the still image signal processing circuit 54. The digital image data after this optical distortion correction is, via the memory control circuit 36, temporarily stored in the image data temporarily storing section 20.

In subsequent step 122, the CPU 48 instructs the memory control circuit 36 to read out the digital image data which is stored in the image data temporarily storing section 20, and to transmit the data to the LCD driving circuit 34. The CPU 48 instructs the LCD driving circuit 34 to display an image based on this digital image data.

In this way, the digital image data is read out from the image data temporarily storing section 20 by the memory control circuit 36, is transmitted to the LCD driving circuit 34 via the memory control circuit 36, and is converted into an NTSC signal by the LCD driving circuit 34. Thereafter, the signal is supplied to the LCD 16, and the results of photographing by the CCD 14 after focus control are displayed on the LCD 16 (hereinafter, this display of the results of photographing which are in a focused state is called "preview display").

Thereafter, until the release button 18A is depressed fully by the photographer, the CPU 48 returns from next step 124 to step 122, and repeats the same processings.

Namely, when the release button 18A is depressed halfway, the continuous results of photographing by the CCD 14 which were photographed after focus control (i.e., the digital image data showing the subject) are converted into VGA size, and the optical distortion thereof is corrected at a low correction accuracy, and the data is preview-displayed on the LCD 16 as dynamic images. The photographer confirms the preview display, and when he/she wishes to take the photograph, the photographer fully depresses the release button 18A.

When the release button 18A is fully depressed, the CPU 48 moves from step 124 to step 126, and instructs the image processing circuit 46 to switch driving from the first distortion correction circuit 56 to the second distortion correction circuit 58, and to carry out gradation conversion to a designated size at the still image signal processing circuit 54.

Moreover, synchronously with the full depression of the release button 18A and under predetermined exposure control (shutter speed, diaphragm, and the like), the digital camera 10 photographs the subject, which is in a focused state, one time by the CCD 14. The results of photographing by the CCD 14 are converted into digital image data by the A/D converter, and are thereafter inputted to the image processing circuit 46. At the image processing circuit 46, first, the digital image data inputted from the signal processing circuit 50 is processed in the same way as at the above-described photographing standby time. Thereafter, the data is inputted to the still image signal processing circuit 54, and is, by the still image signal processing circuit 54, gradation-converted to the image size designated in advance by the photographer. Then, at the image processing circuit 46, the digital image data, which has been converted to VGA size, is transmitted to the second distortion correction circuit 58 which is driven by instruction of the CPU 48. At the second distortion correction circuit 58, processing for correcting the optical distortion is carried out.

Namely, the digital image data, which has been converted to the designated image size by the still image signal processing circuit 54, is, by the second distortion correction circuit 58, subjected to optical distortion correction, at a relatively high correction accuracy, with respect to both the horizontal direction and the vertical direction. The digital image data after this optical distortion correction is, via the memory control circuit 36, temporarily stored in the image data temporarily storing section 20.

Then, in subsequent step 128, the CPU 48 instructs the memory control section 36 to read out the digital image data stored in the image data temporarily storing section 20 and transmit the data to the compression/decompression circuit 38. The CPU 48 instructs the compression/decompression circuit 38 to carry out compression processing. In this way, the digital image data is read out from the image data temporarily storing section 20 by the memory control circuit 36, is transmitted to the compression/decompression circuit 38 via the memory control circuit 36, and is compressed by the compression/decompression circuit 38.

Then, in subsequent step 130, instructions are given to transmit the digital image data, which has been compressed by the compression/decompression circuit 38, to the media control circuit 42, and to store the data in the external recording medium 72. The series of sequence processings for still image photographing are completed. In this way, the digital image data, which has been compressed by the compression/decompression circuit 38, is stored in the external recording medium 72 via the media control circuit 42.

Accordingly, when the still image photographing mode is selected, when the photographer depresses the release button 18A fully so as to give an instruction to photograph the still image, the results of photographing by the CCD 14 which have been photographed in a focused state (i.e., the digital image data expressing the subject) are converted into the image size designated by the photographer, and the optical distortion thereof is corrected at a high correction accuracy, and the data is recorded in the external recording medium 72.

Note that, before recording the data in the external recording medium 72, the digital image data which is temporarily stored in the image data temporarily storing section 20 may be read out, and an image based on this digital image data may be displayed on the LCD 16 such that that photographer can confirm the results of photographing. After the photographer has confirmed the results of photographing, if the operation section 18 is operated and a recording instruction inputted, the digital image data can be read out from the image data temporarily storing section 20, compressed at the compression/decompression circuit 38, and recorded in the external recording medium 72. Further, display on the LCD 16 may be carried out simultaneously with recording onto the external recording medium 72.

In this way, when an image based on the digital image data is displayed on the LCD 16 before or simultaneously with recording onto the external recording medium 72, the following is preferable in consideration of the waiting time required for the display: at the still image processing circuit 54, digital image data of VGA size is also prepared, and the first distortion correction circuit 56 is selected and subjects this digital image data to correction, and the data is recorded in the external recording medium 72. Separately therefrom, digital image data, which is VGA size and which has been subjected to optical distortion correction at a low correction accuracy, is generated for display, and is stored in the image data temporarily storing section.

Figure 5:
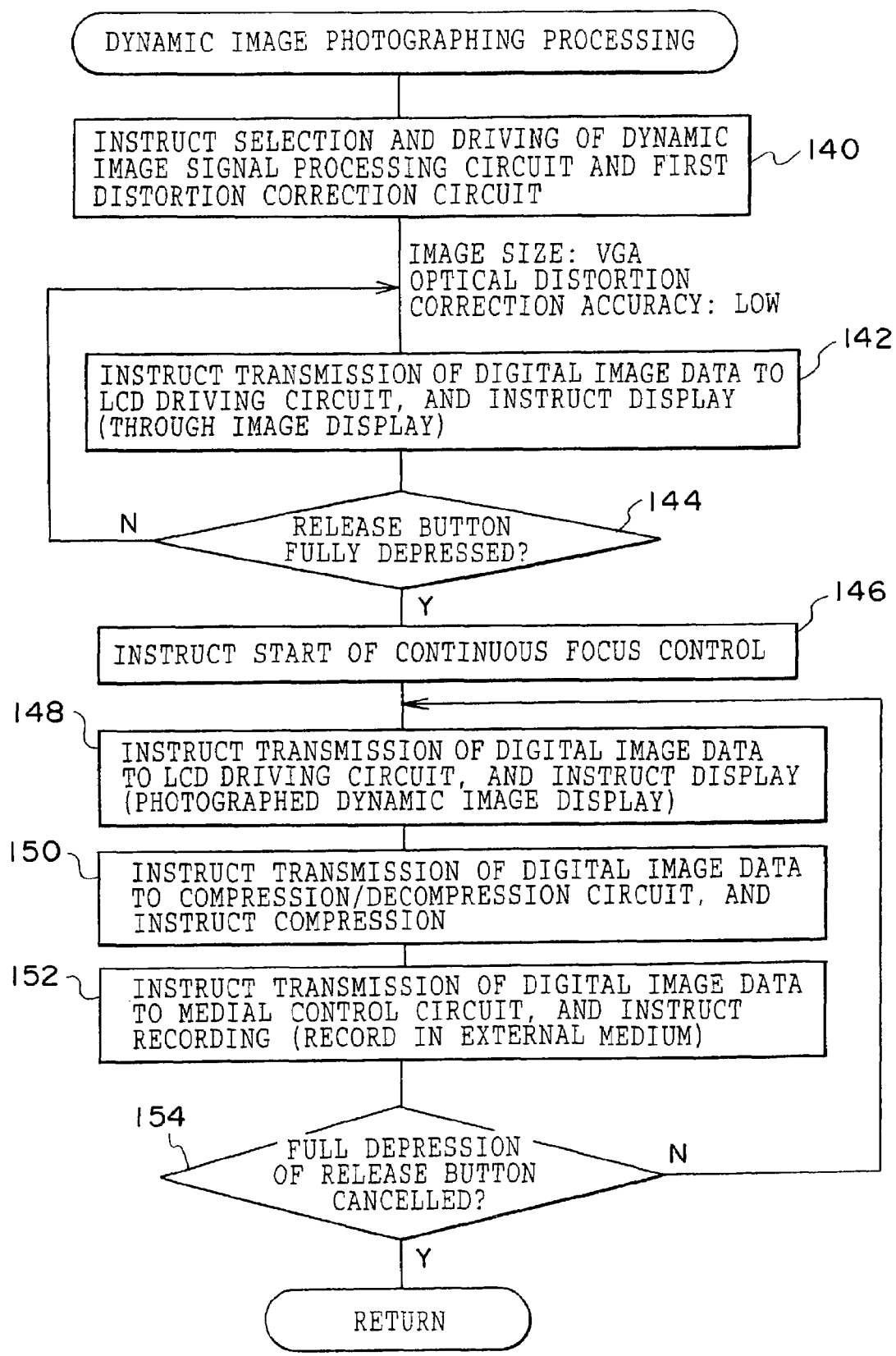
FIG. 5 is a flowchart showing dynamic image photographing processing (a sub-routine) executed at the CPU of the digital camera relating to the present embodiment.

On the other hand, if the photographing mode selected by the photographer operating the mode switching switch 18B is the dynamic image photographing mode, the routine proceeds from step 100 in FIG. 3 to step 102 and step 106, and the sequence processings (dynamic image photographing processing), which are for photographing dynamic images and are shown in FIG. 5, are carried out.

As shown in FIG. 5, in the dynamic image photographing processing, first, in step 140, the image signal processing circuit 46 is instructed to select and drive the dynamic image signal processing circuit 52 and the first distortion correction circuit 56, and carries out other predetermined start-up processings, and a photographing standby state arises. The same processings as those at the time of photographing standby in the case in which the still image photographing mode is selected are also carried out at the time of photographing standby in the case in which the dynamic image photographing mode is selected.

Namely, the results of continuous photographing by the CCD 14 are gradation-converted into VGA size by the dynamic image signal processing circuit 52, and correction processing is carried out by the first distortion correction circuit 56 such that the optical distortion in the horizontal direction is corrected. The digital image data after this optical distortion correction is temporarily stored in the image data temporarily storing section 20 via the memory control circuit 36.

In subsequent step 142, the CPU 48 instructs the memory control circuit 36 to read out the digital image data which is stored in the image data temporarily storing section 20, and to transmit the data to the LCD driving circuit 34. The CPU 48 instructs the LCD driving circuit 34 to carry out dynamic image display of the image based on this digital image data.

In this way, the digital image data is read out from the image data temporarily storing section 20 by the memory control circuit 36, and is transmitted to the LCD driving circuit 34 via the memory control circuit 36, and is converted into an NTSC signal by the LCD driving circuit 34. Thereafter, the signal is supplied to the LCD 16, and the continuous results of photographing by the CCD 14 are displayed as dynamic images. Thereafter, until the release button 18A is depressed fully, the CPU 48 returns from the subsequent step 144 to step 142, and repeats the same processings.

Namely, at the time of photographing standby in the case in which the dynamic image photographing mode is selected, the continuous results of photographing by the CCD 14 (i.e., the digital image data showing the subject) are converted into VGA size, and the optical distortion is corrected at a low correction accuracy, and the data is displayed as dynamic images on the LCD 16 (so-called through image display). Thus, the photographer uses the LCD 16, which is carrying out this dynamic image display, as a finder, and when he/she wishes to take the photograph, the photographer depresses the release button 18A fully.

When the release button 18A is fully depressed, the routine moves from step 144 to step 146, and the CPU 48 instructs the A/F control circuit 32 to start continuous focus control. In this way, at the digital camera 10, continuous photographing is carried out by the CCD 14 while continuous focus control is carried out by the A/F control circuit 32. In the same way as at the time of photographing standby, the results of photographing by the CCD 14 are gradation-converted into VGA size by the dynamic image signal processing circuit 52, and correction processing is carried out by the first distortion correction circuit 56 so that the optical distortion in the horizontal direction is corrected. The digital image data after this optical distortion correction is temporarily stored in the image data temporarily storing section 20 via the memory control circuit 36.

Then, in subsequent step 148, the CPU 48 instructs the memory control circuit 36 to read out the digital image data which is stored in the image data temporarily storing section 20, and to transmit the data to the LCD driving circuit 34. The CPU 48 instructs the LCD driving circuit 34 to carry out dynamic image display of the images based on this digital image data. In this way, the subject which is being photographed is displayed as dynamic images on the LCD 16.

Simultaneously therewith, in step 150, the memory control circuit 36 is instructed to read out the digital image data stored in the image data temporarily storing section 20 and to transmit the data to the compression/decompression circuit 38 as well, and the compression/decompression circuit 38 is instructed to carry out compression processing. In subsequent step 152, instructions are given to transmit the digital image data after compression by the compression/decompression circuit 38 to the media control circuit 42 and to store the data in the external recording medium 72.

In this way, the digital image data is read out from the image data temporarily storing section 20 by the memory control circuit 36, and is transmitted to the compression/decompression circuit 38 via the memory control circuit 36, and is compressed by the compression/decompression circuit 38. Then, the digital image data after compression by the compression/decompression circuit 38 is transmitted to the media control circuit 42, and is recorded in the external recording medium 72 via the media control circuit 42.

Then, during the period of time when the release button 18A is being depressed fully, the routine returns from subsequent step 154 to step 138, and the same processings are repeated. While the dynamic images which are being photographed are displayed on the LCD 16, the digital image data expressing the dynamic images are recorded in the external recording medium 72. Thereafter, when the photographer releases the full depression of the release button 18A, the judgement in step 154 is affirmative, and the series of sequence processings for dynamic image photographing are ended. It goes without saying that, at this time, predetermined photographing ending processings, such as writing EOF to the external recording medium 72 and the like, are carried out.

In this way, when the dynamic image photographing mode is selected, during the time when the release button 18A is fully depressed by the photographer such that photographing of dynamic images is instructed, the continuous results of photographing by the CCD 14, which are photographed in a focused state, (i.e., the digital image data expressing the subject) are converted into a small image size such as VGA size, and the optical distortion is corrected at a low correction accuracy, and the data is recorded in the external recording medium 72.

Note that, in the present embodiment, the destination of the output for each of the distortion correction circuits 56, 58 which carry out correction of the optical distortion, is fixed such as, for example, the digital image data is stored in different folders of the external recording medium 72 which are set in advance, or the like. In this way, at the external recording medium 72, it is possible to store the digital image data such that they are arranged as still images and dynamic images. Note that, if the digital camera 10 is a digital camera which can record onto plural external recording media 72, it suffices to switch the external recording medium 72 in which the digital image data is stored (recorded), for each distortion correction circuit.

On the other hand, when the photographer wishes to display, on the LCD 16, digital image data expressing a still image or dynamic images which were already photographed and recorded in the external recording medium 72 as described above, the photographer operates the mode switching switch 18B and switches to the playback mode. When the playback mode is selected by the photographer operating the mode switching switch 18B, the digital camera 10 proceeds from step 100 of FIG. 3 to step 108, and playback processing (not shown) is carried out. For example, a list of the digital image data stored in the external recording medium 72, or the like, is displayed on the LCD 16, and the photographer is urged to select therefrom the digital image data which he/she wishes to playback. At this time, as described above, the digital image data are stored in the external recording medium 72 so as to be arranged as still images and dynamic images. Thus, the photographer can easily select the desired digital image data.

Then, when the photographer designates the digital image data which he/she wishes to playback by operation of the cursor button 18C or the like, the designated digital image data is read out from the external recording medium 72, and is decompressed at the compression/decompression circuit 38, and an image based on the digital image data (either a still image or dynamic images) is displayed on the LCD 16.

In this way, in the present embodiment, the first distortion correction circuit 56, which can carry out processing at a low correction accuracy but in a short time, and the second distortion correction circuit 58, which carries out processing at a high correction accuracy but requires time for processing, are provided, as distortion correction circuits for correcting optical distortion, at the image processing circuit 60 for processing digital image data. Under control of the CPU 48, it is possible to switch the distortion correction circuit which is used for correction, when the still image photographing mode is selected and when the dynamic image photographing mode is selected. Further, when the still image photographing mode is selected, during the series of sequence processings for photographing the still image, it is possible to switch the distortion correction circuit which is used in correction in accordance with the stage of the processing as well.

In this way, for example, by selecting the first distortion correction circuit 56 and correcting the optical distortion at the time of still image or dynamic image photographing standby, the correction processing can be carried out in a short time. The subject, which is in a state in which the optical distortion has been corrected, can be displayed on the LCD 16 as a through image substantially in real time.

Further, in the same way, also at the time of preview display for photographing a still image, the first distortion correction circuit 56 is selected and the optical distortion is corrected. Thus, the subject, which is in a state in which the optical distortion has been corrected, can be displayed on the LCD 16 substantially in real time. At the time of actually photographing the still image (i.e., at the time when the still image photographing mode is selected and the release button 18A is depressed fully), by selecting the second distortion correction circuit 58 and correcting the optical distortion, it is possible to obtain digital image data in which optical distortion has been corrected at a high correction accuracy. In this way, at the time of through image display and at the time of preview image display, the subject can be confirmed in a state in which the optical distortion has been corrected, albeit at a low correction accuracy, and it is possible to move to the actual still image photographing. Thus, digital image data is obtained which expresses the subject which is substantially equivalent to the subject which the photographer has imagined.

Further, at the time of photographing dynamic images (i.e., at the time when the dynamic image photographing mode is selected and the release button 18A is depressed fully), the first distortion correction circuit 56 is selected, and the optical distortion is corrected. In this way, the subject can be displayed on the LCD 16 substantially in real time, and the photographer can carry out dynamic image photographing while confirming the results of photographing.

Note that, the above explanation described, as an example, a case in which optical distortion correction is always carried out on the digital image data. However, the present invention is not limited to the same, and can be structured such that it is possible to select whether or not correction is to be carried out.

For example, the above explanation described, as an example, a case in which optical distortion correction is carried out at a high correction accuracy by the second distortion correction circuit 58 on the digital image data which expresses a still image. However, the present invention can be structured such that the photographer can select whether or not this correction is to be carried out. In this case, it suffices to carry out the processings of FIGS. 6A and 6B rather than those of FIGS. 4A and 4B. Note that the structures and the other processings may be the same as those described above, and therefore, description thereof is omitted. Further, in FIGS. 6A and 6B, the same processings as in FIGS. 4A and 4B are denoted by the same step numbers, and detailed description thereof will be omitted.

Namely, when the still image photographing mode is selected by the photographer operating the mode switching switch 18B, the still image photographing processing is started. However, as shown in FIGS. 6A and 6B, in this still image photographing processing, first, in step 160, the photographer is urged, by display of the LCD 16, to select whether or not optical distortion correction processing is to be carried out at the digital camera 10. When the photographer selects and designates either one of "execute" or "do not execute" the correction processing by operating the cursor button 18C as a correction execution selection portion, the routine moves on to step 110. Thereafter, the same processings as described above (the same processings as in FIGS. 4A and 4B) are carried out, and a through image or a preview image is displayed on the LCD 16.

Then, when the release button 18A is fully depressed by the photographer, at the digital camera 10, the subject which is in a focused state is photographed one time by the CCD 14 under predetermined exposure control (shutter speed, diaphragm, and the like). At this time, the CPU 48 proceeds from step 124 to step 162, and judges whether or not execution of optical distortion correction processing at the digital camera 10 was designated in previously-described step 160.

If optical distortion correction processing at the digital camera 10 was designated in step 160, the routine proceeds from step 162 to step 126. The image processing circuit 46 is instructed to switch driving from the first distortion correction circuit 56 to the second distortion correction circuit 58, and to carry out gradation conversion to the designated size at the still image signal processing circuit 54. Thereafter, the same processings as described above (the same processings as in FIGS. 4A and 4B) are carried out. In this way, the digital image data which expresses a still image is subjected to optical distortion correction at a high correction accuracy by the second distortion correction circuit 58, and is compressed by the compression/decompression circuit 38, and is recorded in the external recording medium 72.

On the other hand, if it was designated in step 160 to not execute optical distortion correction processing at the digital camera 10, the routine proceeds from step 162 to step 164.

The image processing circuit 46 is instructed to carry out gradation conversion to the designated size at the still image signal processing circuit 54, and to discontinue driving of both the first distortion correction circuit 56 and the second distortion correction circuit 58. In this way, the digital data, which has been gradation-converted to the designated size at the still image signal processing circuit 54, is temporarily stored in the image data temporarily storing section 20 via the memory control circuit 36, without being subjected to correction processing by. either of the first and second distortion correction circuits 56, 58.

Note that, when an image based on the digital image data is displayed on the LCD 16 before or simultaneously with recording onto the external recording medium 72 so that the photographer can confirm the results of photographing, the following is preferable in consideration of the wait time required for display: digital image data of VGA size is also prepared at the still image processing circuit 54, and the first distortion correction circuit 56 is selected and subjects this digital image data to correction, and the data is recorded in the external recording medium 72. Separately therefrom, digital image data, which is VGA size and has been subjected to optical distortion correction at a low correction accuracy, is generated for display, and is stored in the image data temporarily storing section.

Then, in subsequent step 166, the CPU 48 instructs the memory control circuit 36 to read out the digital image data stored in the image data temporarily storing section 20 and transmit the data to the compression/decompression circuit 38. The CPU 48 instructs the compression/decompression circuit 38 to carry out compression processing. Next, in subsequent step 168, instructions are given to transmit the digital image data, which has been compressed by the compression/decompression circuit 38, to the media control circuit 42, and to store the data in the external recording medium 72. At this time, information expressing that optical distortion correction processing has not been carried out, or information expressing the optimal parameters for carrying out the optical distortion correction processing (the set of coefficients of the polynomial), or the like is generated as correction information. An instruction is given to record this correction information together with the compressed digital image data.

In this way, by making it possible to select whether correction processing is to be executed or not, it is possible to omit optical distortion correction in cases in which it is not particularly needed, such as in cases in which the photographer does not mind even if optical distortion is included in the digital image data. It is thereby possible to shorten the overall processing time required for photographing.

Further, at the digital camera 10, when the optical distortion correction processing is not carried out, the correction information is recorded together with the digital image data in the external recording medium 72. In this way, the following handling is possible even in cases in which digital image data which have not been subjected to correction processing and digital image data which have been subjected to correction processing are both recorded in the external recording medium 72.

For example, when the playback mode is selected, when digital image data which has not undergone correction processing is designated as the object of playback, by referring to the correction information, notice can be given that processing for correcting the optical distortion has not been carried out.

Further, a structure can be utilized in which an instruction to carry out optical distortion correction on digital image data, which is recorded in the external recording medium 72 in a state of not having undergone optical distortion correction processing, is received later. In this case, after the digital image data is read out from the external recording medium 72 and decompressed by the compression/decompression circuit 38, the correction information recorded together with that digital image data can be referred to from the external recording medium 72, and the appropriate parameters can be selected from the second distortion correction circuit 58, and correction processing can be carried out.

Further, as shown by the dashed line in FIG. 1, if application software 74, which carries out optical distortion correction processing, is installed in the PC 70, digital image data, which is recorded in the external recording medium 72 without having undergone optical distortion correction processing, can be transmitted to the PC 70, and processing for correcting the optical distortion can be carried out at the PC 70. In this case, if the correction information is transmitted to the PC 70 together with the digital image data, the appropriate parameters can be set by referring to the correction information at the time when the application software 74, which carries out the optical distortion correction processing, is executed at the PC 70 and the optical distortion correction processing is carried out on the digital image data.

In FIGS. 6A and 6B, explanation is given of an example in which, when the still image photographing mode is selected, it is possible to designate (select) whether or not correction processing is to be carried out on the digital image data expressing the still image obtained by photographing. However, the present invention can be structured such that this designation (selection) of whether or not correction processing is to be carried out is possible also when the dynamic image photographing mode is selected. Further, the present invention can be structured such that this designation (selection) of whether or not correction processing is to be carried out is possible for digital image data which is displayed as a through image or a preview image.

The above explanation described a case in which the two distortion correction circuits 56, 58 are provided as the correction sections. However, the present invention is not limited to the same, and three or more distortion correction circuits may be provided. For example, it is possible to provide three distortion correction circuits, and to, in the still image photographing routine, select a different distortion correction circuit at each of the time of displaying a through image, the time of displaying a preview image, and the time of actually photographing the still image, and to carry out processing for correcting the optical distortion.

What is claimed is:

1. A digital photographing device photographing a subject via an optical lens and acquiring digital image data expressing the subject, the digital photographing device comprising:

a plurality of correction sections correcting optical distortion included in the digital image data, and having different correction accuracies and different processing speeds corresponding to the correction accuracies, the optical distortion arising at a periphery of the acquired digital image data due to refraction of the optical lens;

a photographing mode selecting section for selecting at least which of a still image photographing mode and a dynamic image photographing mode the subject is to be photographed in; and a control section which, on the basis of results of selection by the photographing mode selecting section, selects the correction section, and carries out control such that the optical distortion of the digital image data is corrected by the selected correction section.

2. The digital photographing device of claim 1, wherein, during a series of photographing processings from selection of the photographing mode by the photographing mode selecting section to completion of photographing in accordance with that photographing mode, the control section switches selection of the correction section at each predetermined processing stage.

3. The digital photographing device of claim 2, further comprising a correction execution selecting section for setting whether or not the correction is to be executed,
wherein the control section discontinues correction by the correction section when it is selected by the correction execution selecting section that correction is not to be executed.

4. The digital photographing device of claim 3, wherein, when correction is discontinued, correction information relating to the discontinued correction is stored in a storing section.

5. The digital photographing device of claim 4, wherein the correction information includes at least one of information expressing that correction has not been carried out, and a polynomial approximating the optical distortion which polynomial is needed at a time of carrying out correction later.

6. The digital photographing device of claim 5, wherein the correction information is stored in the storing section together with digital image data for which correction was discontinued.

7. The digital photographing device of claim 2, wherein the correction section having a relatively low correction accuracy corrects optical distortion with respect to only a predetermined one direction.

8. The digital photographing device of claim 2, wherein, at at least one of the correction sections, an image size of an object of correction is fixed.

9. The digital photographing device of claim 2, wherein, for each of the plurality of correction sections, an output destination of digital image data after correction is fixed.

10. The digital photographing device of claim 2, wherein the correction sections approximate the optical distortion by a polynomial, and correct the optical distortion by interpolating each pixel after correction from digital image data before correction.

11. The digital photographing device of claim 1, further comprising a correction execution selecting section for setting whether or not the correction is to be executed,
wherein the control section discontinues correction by the correction section when it is selected by the correction execution selecting section that correction is not to be executed.

12. The digital photographing device of claim 11, wherein, when correction is discontinued, correction information relating to the discontinued correction is stored in a storing section.

13. The digital photographing device of claim 12, wherein the correction information includes at least one of information expressing that correction has not been carried out, and a polynomial approximating the optical distortion which polynomial is needed at a time of carrying out correction later.

14. The digital photographing device of claim 13, wherein the correction information is stored in the storing section together with digital image data for which correction was discontinued.

15. The digital photographing device of claim 1, wherein the correction section having a relatively low correction accuracy corrects optical distortion with respect to only a predetermined one direction.

16. The digital photographing device of claim 1, wherein, at at least one of the correction sections, an image size of an object of correction is fixed.

17. The digital photographing device of claim 1, wherein, for each of the plurality of correction sections, an output destination of digital image data after correction is fixed.

18. The digital photographing device of claim 1, wherein the correction sections approximate the optical distortion by a polynomial, and correct the optical distortion by interpolating each pixel after correction from digital image data before correction.

* * * * *